US007509650B2

(12) United States Patent
Dinh et al.

(10) Patent No.: US 7,509,650 B2
(45) Date of Patent: Mar. 24, 2009

(54) ENHANCE BROWSING OF MESSAGES IN A MESSAGE QUEUE

(75) Inventors: Hung The Dinh, Austin, TX (US); Teng Hu, Austin, TX (US); Phong Anh Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 10/850,390

(22) Filed: May 20, 2004

(65) Prior Publication Data

US 2005/0262515 A1 Nov. 24, 2005

(51) Int. Cl.
*G06F 13/00* (2006.01)
(52) U.S. Cl. ................... 719/314; 719/313; 719/317; 707/1; 707/3
(58) Field of Classification Search .............. 719/313, 719/314, 317; 707/1, 3
See application file for complete search history.

(56) References Cited

U.S. PATENT DOCUMENTS 6,625,751 B1 * 9/2003 Starovic et al. ............ 714/11
6,957,390 B2 * 10/2005 Tamir et al. ............... 715/744
7,127,507 B1 * 10/2006 Clark et al. ............... 709/224
2005/0071848 A1 * 3/2005 Kempin .................... 719/314
2005/0114487 A1 * 5/2005 Peng et al. ................ 709/223

FOREIGN PATENT DOCUMENTS

EP 1129405 B1 9/2002
WO WO 99/16206 4/1999

* cited by examiner

*Primary Examiner*—Andy Ho
(74) *Attorney, Agent, or Firm*—Herman Rodriguez; Schubert Osterrieder & Nickelson PLLC (57) ABSTRACT

Methods to enhance browsing of messages in a message queue are disclosed. Embodiments include hardware and/or software for tracking records browsed by one or more agents. The agents can be processes designed to collect, process, and/or reformat data for an upperware application, a data warehouse, and/or similar arrangements. When agents set up communications with a queue, the agents may include an attribute setting that instructs the middleware to track the last record browsed and/or the next record to browse. In response to setting the attribute, some embodiments record the current record number, row number, queue identifier, and/or the like in a database with an agent identification (ID). Then, whenever an agent re-establishes communication with the middleware queue using the same ID, the middleware can retrieve the current record number.

8 Claims, 5 Drawing Sheets

ENHANCE BROWSING OF MESSAGES IN A MESSAGE QUEUE

FIELD OF INVENTION

The present invention is in the field of message queuing (MQ). More particularly, the present invention relates to methods, systems, and media to enhance browsing of messages in a message queue of middleware such as IBM Websphere™ (MQSeries™), Sonic MQ™, and Microsoft MQ™.

BACKGROUND

Demands on computer systems to perform greater numbers of complex and critical functions has led to the distribution of functions, or portions thereof, to specialized systems. These specialized systems can then be optimized for specific tasks at the expense of being loosely coupled, which increases the complexities involved with system integration.

For some specialized systems, the complexity of full system integration has proved infeasible and has been avoided by redundantly maintaining selected data in various databases as well as maintaining redundant suites of applications to process that data. In an engineering company, for example, significant differences exist between systems for accounting and engineering groups. The accounting systems maintain data related to budget, man-hours, pay scales, and taxes, while the engineering systems maintain data related to engineering analyses, materials, designs, man-hours and budget. Although access to data regarding man-hours, budgets, and budgetary projections for the engineering groups by the accounting system is necessary, the costs involved with integrating these systems may be much more than costs involved with maintenance of redundant databases. In particular, raw data utilized to generate the projections for the engineering group may be useful to the accounting systems so complex programming and intimate knowledge of the engineering systems may be necessary to retrieve the raw data, which also adds a significant processing burden to the engineering systems. On the other hand, maintenance of redundant data increases the difficulty associated with ensuring that the data is correct and updated in a timely manner. Maintenance of redundant data also increases the difficulty associated with ensuring that processes such as budget projections, which are designed to manipulate the data, do so accurately.

One solution to combat the complexities involved with integration of loosely coupled, specialized systems is to incorporate a common interface such as a middleware application on each of the specialized systems. The middleware applications, such as IBM's message queuing Websphere™ applications, facilitate messaging systems that allow one system to gather data from another system.

The specialized systems can send messages to store data in queues of the middleware, and processing systems that are independent of, e.g., the accounting and engineering systems, can process and format the data. The message queuing applications can then store the data in, e.g., a data warehouse so the data can be accessed and utilized by any system having access privileges. Moreover, data that is reformatted and processed for the accounting systems may be stored in a database local to the accounting systems and data that is reformatted and processed for the engineering systems can be stored in a database local to the engineering systems, whether or not the accounting systems and/or engineering systems are in the same city, state, or even country.

As the messaging systems between the multiple, specialized systems become more prevalent and systems become more dependent upon the communications, system failures become a more critical problem, causing other, linked systems to hang or fail. In particular, an agent searching through messages in a message queue for data to, e.g., move to a data warehouse, may lose their pointer to the message queue, which may, for instance, contain hundreds of thousands of entries. Thus, after the failure, the agent must start from the beginning of the entries, searching through hundreds of thousands of entries and reformatting and processing thousands of entries again. Even worse, if the cause of the failure is a faulty entry at, e.g., record number 300,001, the failure may occur again once the agent reaches record 300,001.

One solution is to integrate routines in every agent to remember and store the current record that is being processed prior to processing the record. However, agents can be unique applications for each particular process and system. Thus, a large number of lines of code may be necessary to implement such protection for each and every agent associated with each and every specialized system.

Therefore, there is a need for tracking the record numbers of queues being accessed by an agent without significantly impacting code requirements for agents.

SUMMARY OF THE INVENTION

The problems identified above are in large part addressed by methods to enhance browsing of a message queue. One embodiment provides a method to enhance browsing of a message queue of a middleware application. The method generally includes receiving from an agent, by the middleware application, a request to track a first message, wherein the request is associated with browsing the first message in the message queue. The middleware application creates a record to associate the first message with the agent in response to the request. The middleware application then modifies the record to associate the agent with a second message in response to receipt of a subsequent request from the agent to browse the second message. Such tracking provides the middleware application with the ability to establish an association between the second message and the agent based upon the record, after a loss of a communication channel between the agent and the message queue.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods to enhance browsing of messages in a message queue are contemplated. Embodiments include hardware and/or software for tracking records browsed by one or more agents. The agents are processes designed to collect, process, and/or re-format data for an upperware application, a data warehouse, and/or similar systems. Some of the more complex processing may be implemented by upperware applications.

When the agents initially set up communications with a message queue such as by sending a request to log in, possibly satisfy other criteria, and set up a communications channel, the agents may include an attribute setting that instructs the middleware to track, e.g., the last record browsed and/or the next record to browse. The queue may include messages, or data, supplied by one or more systems such as sales systems, marketing systems, engineering systems, and the like to facilitate communication of different types of data between the systems. In response to setting the attribute, e.g., a continue_browse attribute, many embodiments record the current record identifier, row number, queue identifier, and/or the like in a database with an agent identification (ID). Then, whenever the agent re-establishes communication with the middleware queue using the same agent ID, the middleware can retrieve the current record identifier such as a record number.

In further embodiments, the agent may request that, e.g., the current, prior, or next record number in a browse sequence be returned in response to the request. In several embodiments, the middleware may store the next record number to be accessed rather than the most recently browsed record number. Advantageously, such embodiments alleviate a burden on applications in upperware to track the records being browsed in a message queue in case of a communications or other failure.

Figure 1:
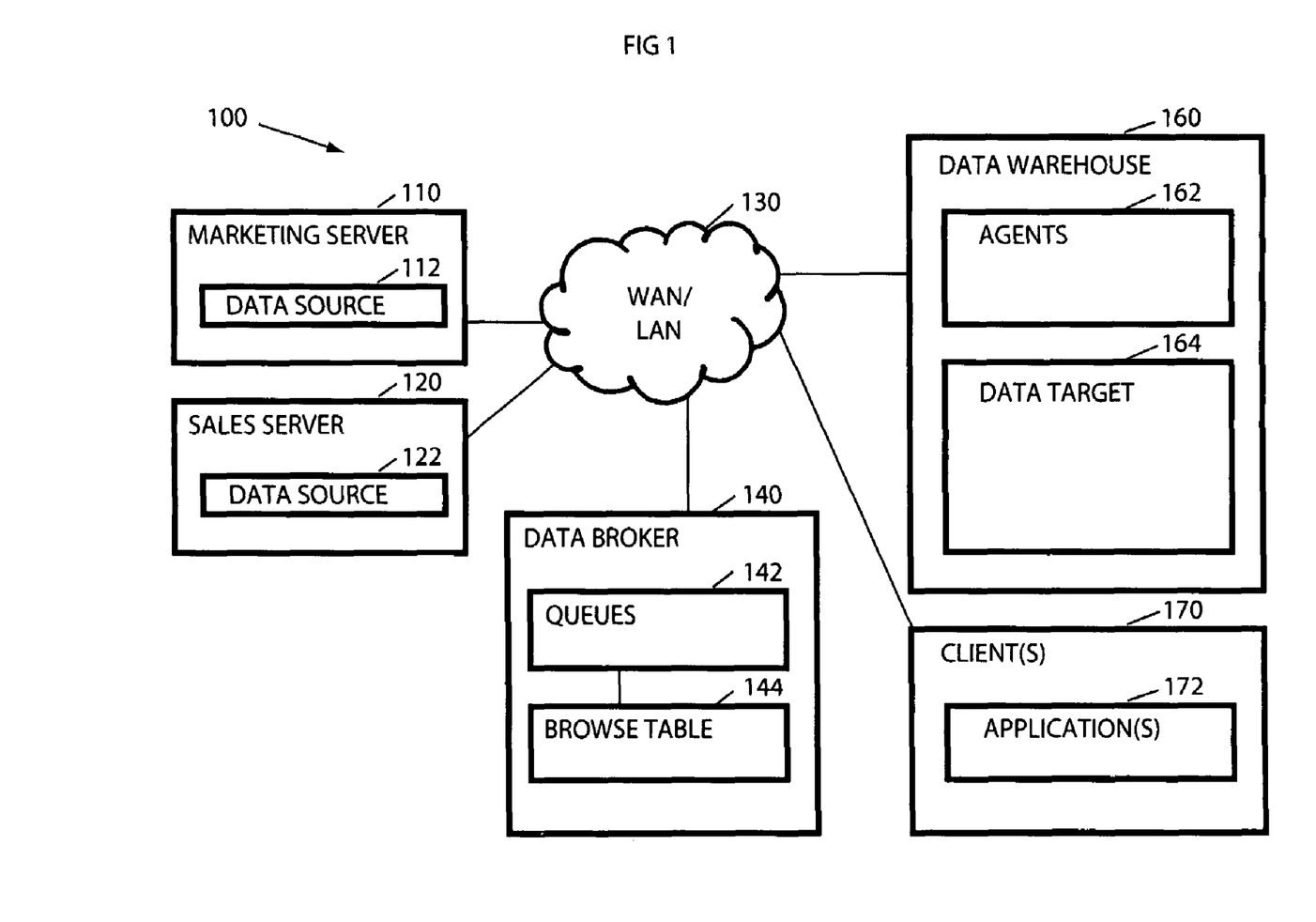
FIG. 1 depicts an embodiment of a system for data warehousing processed and reformatted data by a data broker.

Turning now to the drawings, FIG. 1 depicts an embodiment of a system 100 to enhance browsing of a message queue. More specifically, system 100 may facilitate communication of marketing and sales data in the form of messages like requests, replies, and informs (messages in which no response is expected). The messages may facilitate communication of the data between various computer systems of a wide area network or local area network (WAN/LAN) 130 such as marketing server 110, sales server 120, data broker 140, data warehouse 160, and client(s) 170. In many embodiments, system 100 may include computers such as workstations, servers, mobile computers, personal digital assistants (PDAs) and the like that request, process, and/or maintain data.

The computers may include a middleware like IBM's MQSeries™ to provide an interface so applications can access data and data processing capabilities of other computers. For instance, marketing server 110, sales server 120, data warehouse 160, and client(s) 170 include client components of the MQSeries™ software to allow these computers to establish a client connection, or communication channel, with the MQSeries™ server software on data broker 140. Data broker 140 may then collect, reformat, process, and store the data in data warehouse 160 for use by other computer systems. For example, if a bank customer took out a loan or opened a certificate of deposit (CD) at the teller window, by the time the customer made it to the new accounts desk data related to the loan or CD may be collected by data broker 140, reformatted for compatibility with application program interfaces (APIs) associated with data warehouse 160 and stored in data target 164. Applications such as applications 172 of client(s) 170 would be aware of the change. The bank would access the customer differently (and subsequently look at the customer's profitability differently) because the customer's portfolio had already been updated. Data warehouse 160 enables the bank to automatically distribute the most current data so that all applications can access the most recent information on that customer, providing the most accurate picture of the customer's portfolio.

Marketing server 110 may include specialized marketing systems designed to perform analyses such as analyses of product sales trends in different regions, comparisons of successful marketing campaigns in different regions, and the like. Marketing server 110 acts as a point-of-sales (POS) terminal collecting and processing data on regular basis. Marketing server 110 then exports data to data broker 140 via the MQSeries™ communication channel. Further, marketing server 110 receives sales data for product sales in different regions from data target 164 on an hourly basis to facilitate the marketing analyses.

Sales server 120 may include specialized sales systems designed to collect and perform accounting operations on sales data for product sales in different regions. As with marketing server 110, sales server 120 acts as a POS terminal collecting and processing sales data on an hourly basis. Sales server 120 then exports the sales data to data broker 140 via the MQSeries™ communication channel. Sales server may also collect sales projections from marketing analyses performed by marketing server 110 via data warehouse 160.

WAN/LAN 130 is a network connection to couple computers such as marketing server 110, sales server 120, data broker 140, data warehouse 160, and client(s) 170 to transmit messages between the computers. In some embodiments, WAN/LAN 130 may include a network in an office coupled via Ethernet, optical media like OptiConnect, or the like. In some embodiments, WAN/LAN 130 also couples with the Internet via a cable modem, a direct subscriber line (DSL), a T1 line, a T3 line, or the like. In further embodiments, WAN/LAN 130 may include a network of temporary connections such as connections via a telephone system. In other embodiments, one or more computers may couple directly via a communications cable.

Data broker 140 may include a computer system such as an IBM eServer™ having one or more processors, or threads of processors, executing software and/or one or more state machines coupled with data storage devices such as random access memory (RAM), read only memory (ROM), flash memory, compact disk drives, hard drives, and the like. Software executing on data broker 140 may be adapted to receive, process, and respond to messages. The software may also be adapted to track the current position of a pointer to queues 142 for each agent having an established communication channel. Data broker 140 may also include logic to recognize that a message identified by a position being tracked is no longer available. Thus, in response to a request for that record, data broker 140 may return a code indicating that the record is no longer available. In several embodiments, data broker 140 may also return the first record. The first record may be, e.g., the first record in a first in, first out (FIFO) queue structure or may be a record determined by a message priority. For instance, selection of the message based upon a queue structure or message priority may be an optional setting indicated by agents when establishing communication channels.

In some embodiments, the position of the pointers to entries, or records, of queues 142 for agents may be turned on or off based upon setting of an attribute by the agents. For example, agents 162 of data warehouse 160 may be designed to browse and select certain types of data from queues 142 hourly. Upon establishing a communication channel with queues 142 of data broker 140, one or more of agents 162 may set a continue_browse attribute to indicate that pointer positions for those agents should be tracked.

Queues 142 may store, reformat, and process data received from marketing server 110 and sales server 120. The data may be received in the form of messages and the messages may include information describing the how to process, reformat, and/or otherwise transform the data contained in the message. Based upon that information, data broker 140 may reformat the data and/or implement one or more processes to transform the data so that other specialized systems such as client(s) 170 can interpret and use the data as stored in data target 164. In some embodiments, the data in different stages of transformation may be useful to one or more other computer systems like client(s) 170 so agents 162 harvest the useful versions of the data for storage in data target 164.

In several embodiments, queues 142 may include persistent queues. In many of such embodiments, a local queue manager may periodically store the contents for each queue of queues 142 in non-volatile memory, advantageously protecting against a loss of the messages in the event of a failure.

Browse table 144 includes a record identifier to facilitate tracking the current record being accessed by an agent so that, in case the communication channel between the agent and data broker 140 fails for any reason and the agent is able to re-establish the communication channel with data broker 140, the agent can begin again at the same record that the agent was accessing immediately prior to the failure. Advantageously, the agent can begin browsing the records where it left off prior to the failure without incorporating logic and memory protected against the potential sources of the failure. In some embodiments, the agent may restart communication, accessing the next record in sequence. In several embodiments, the agents may provide an attribute setting that indicates whether the most recently browsed record, prior record, and/or next record in the sequence is tracked by browse table 144.

Browse table 144 may include data associating agents with records in queues 142. For example, browse table 144 may include an agent ID and a record identifier associated with one or more of the records. In many embodiments, agents may set a continue_browse attribute as a logical one to turn on tracking for the current record. In several embodiments, additional attributes and/or additional bits for the setting of the continue_browse attribute may set other options such as whether the prior record, current record, and/or next record should be stored. In additional embodiments, browse table 144 may also store an indication of a search filter being utilized to browse queues 142. In further embodiments, browse table 144 may also include an entry associated with the agent identifiers, indicative of whether or not the record originally associated with the agent is still available. For example, if agents 162 are accessing record number three of queues 142 immediately prior to a loss of the communication channel between agents 162 and queues 142, and record number three is subsequently deleted, an indication that record number three has been deleted may be associated with the corresponding record(s) for agents 162. Then, when agents 162 re-establish the communication channel with queues 142, and request to browse the most recently browsed record, data broker 140 may respond with data from the first record in the sequence and an indication that the most recently browsed record was deleted.

Data warehouse 160 may include one or more computers that extract, transform, load, and maintain marketing and sales data from servers 110 and 120 in data target 162. For example, data warehouse 160 may include IBM's DB2 Warehouse Manager™. In some embodiments, data warehouse 160 may include a central warehouse for data that provides data to departmental or local warehouses, which have subsets of the data maintained in the central warehouse. Data warehouse 160 may also facilitate access to the data by one or more computers coupled with WAN/LAN 130 such as other client (s) 170. In many embodiments, data warehouse 160 may include client components of a middleware application such as MQSeries™ to facilitate gathering, processing, and storing the data.

Data warehouse 160 includes agents 162 and data target 164. Agents 160 may be applications designed to manage the flow of data between data sources 112 and 122 and data target 164. In many embodiments, agents 160 are available on operating systems such as AIX™, Linux™, iSeries™, z/OS™, Windows NT™, Windows 2000™, and Windows XP™. In further embodiments, agents 162 may be available in a Solaris™ operating environment. For example agents 160 may include open database connectivity (ODBC) drivers or DB2 Command Line Interface (CLI), e.g., IBM ES Database Manager, to communicate with different databases, providing data from data warehouse 160 to various specialized systems to provide such systems with the most recent data gathered.

The processes performed by agents 162 may include a series of steps that perform a transformation and movement of data for a specific warehouse use. For instance, a process may move data into data warehouse 160. Then, the data is aggregated and summarized for warehouse use. In some embodiments, processes may generate a single flat table for data target 164. In further embodiments, processes may generate a set of summary tables.

Data target 164 may include raw data and/or data that has been extracted, reformatted, loaded, and/or transformed and stored in tables and/or files. The tables and/or files may be in a format that is utilized as is or parsed by one or more processes accessible to client(s) 170, marketing server 110, sales server 120, and/or other computer systems.

Client(s) 170 may provide a graphical user interface (GUI) for a user to display data gathered from servers 110 and 120. Client(s) 170 include applications 172. Applications 172 may generate messages to request data for processing user-initiated transactions. The messages may include fields and be associated with one or more rules to instruct a thread of, e.g., data broker 140, to gather and/or process data, generate a reply based upon the data gathered and/or processed, and transmit the reply to client(s) 170. For example, the user of client(s) 170 may be an executive of a company and applications 172 may generate one or more messages to process sales and marketing data to generate a projection for revenue flows for the next quarter and to compare the actual revenue flows from the current quarter against last quarter's projections. In particular, the executive may execute an application to generate a graphical summary of the revenue flows and applications 172 may request data about sales and marketing by region, inventory movements, supply purchases, and other data to generate the projected revenue report and compare the actual revenue flows against last quarter's projections. Applications 172 may transmit messages to the marketing server 110, sales server 120, and possibly other servers to gather the data. In response to the messages, data broker 140 may retrieve and process the data and then generate replies with the raw and/or processed data. Data warehouse 160 receives the replies and stores the data in data target 164.

Figure 2:
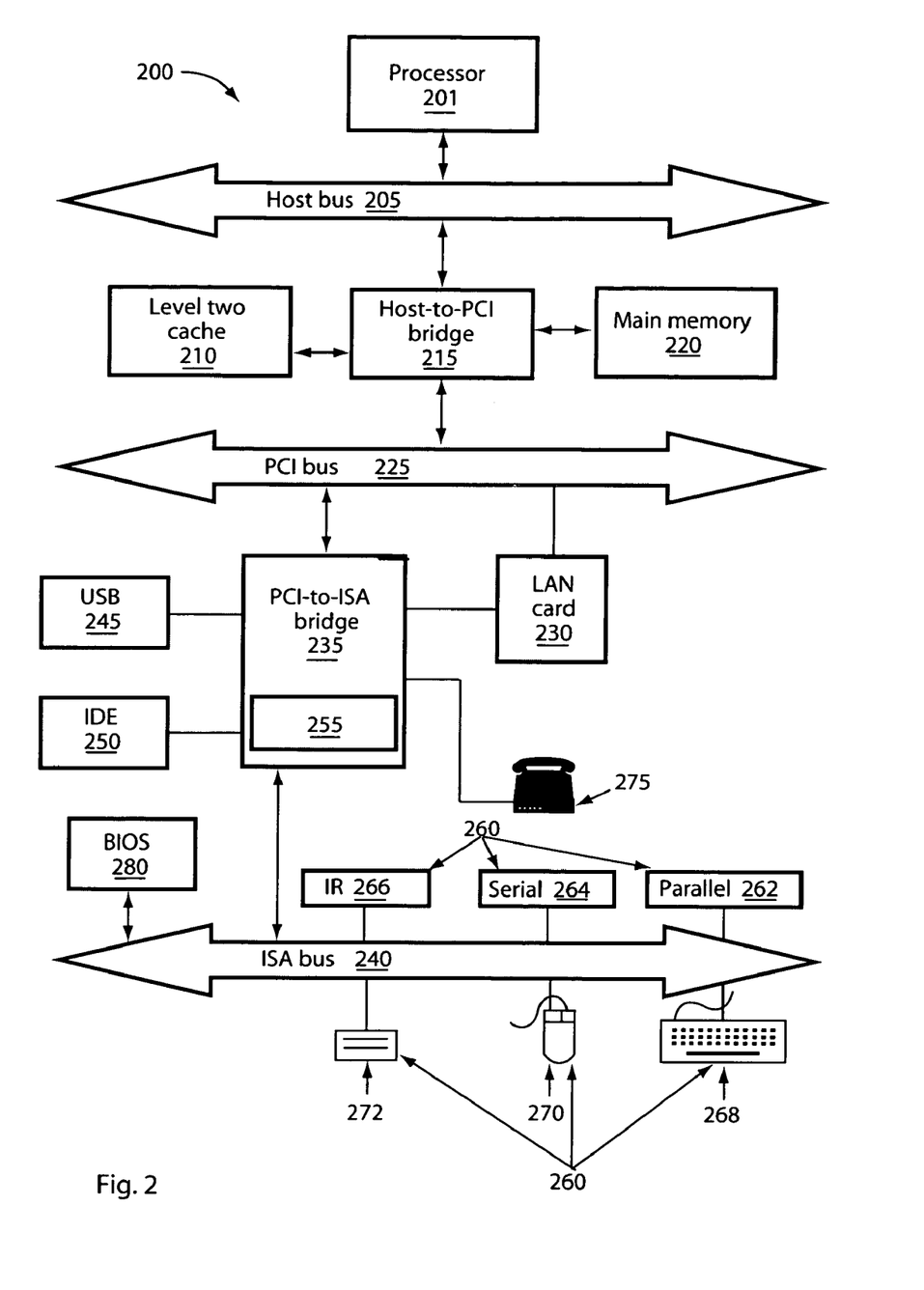
FIG. 2 depicts an embodiment of an apparatus, which is a simplified example of a computer system such as data broker of FIG. 1.

FIG. 2 depicts an embodiment of an information-handling system, which is a simplified example of a computer system such as data broker 140 of FIG. 1. Computer system 200 includes processor 201, which is coupled to host bus 205. A level two (L2) cache memory 210 is also coupled to the host bus 205. Host-to-PCI bridge 215 is coupled to main memory 220, includes cache memory and main memory control functions, and provides bus control to handle transfers among PCI bus 225, processor 201, L2 cache 210, main memory 220, and host bus 205. Main memory 220 may include a middleware application such as MQ Series™. The middleware application may include instructions to implement one or more queues to store data and process the data based upon rules designed to adapt the data for storage in a data warehouse like data warehouse 160 or for use by clients such as clients 170. The middleware application may further include instructions for tracking the latest record accessed by agents that are designed to mange the flow of data between data sources and data targets or clients.

Continuing in FIG. 2, PCI bus 225 provides an interface for a variety of devices including, for example, LAN card 230. PCI-to-ISA bridge 235 provides bus control to handle transfers between PCI bus 225 and ISA bus 240, universal serial bus (USB) functionality 245, IDE device functionality 250, power management functionality 255, and can include other functional elements not shown, such as a real-time clock (RTC), DMA control, interrupt support, and system management bus support. Peripheral devices and input/output (I/O) devices can be attached to various interfaces 260 (e.g., parallel interface 262, serial interface 264, infrared (IR) interface 266, keyboard interface 268, mouse interface 270, fixed disk (HDD) 272) coupled to ISA bus 240. Alternatively, a super I/O controller (not shown) attached to ISA bus 240 may accommodate many I/O devices.

BIOS 280 is coupled to ISA bus 240, and incorporates the necessary processor executable code for a variety of low-level system functions and system boot functions. BIOS 280 can be stored in any computer readable medium, including magnetic storage media, optical storage media, flash memory, random access memory, read only memory, and communications media conveying signals encoding the instructions (e.g., signals from a network). In order to attach computer system 200 to another computer system to copy files over a network, LAN card 230 is coupled to PCI bus 225 and to PCI-to-ISA bridge 235. Similarly, to connect computer system 200 to an ISP to connect to the Internet using a telephone line connection, modem 275 is connected to serial port 264 and PCI-to-ISA bridge 235.

While the computer system described in FIG. 2 is capable of executing the invention described herein, this computer system is simply one example of a computer system. Those skilled in the art will appreciate that many other computer system designs are capable of performing the invention described herein.

Figure 3:
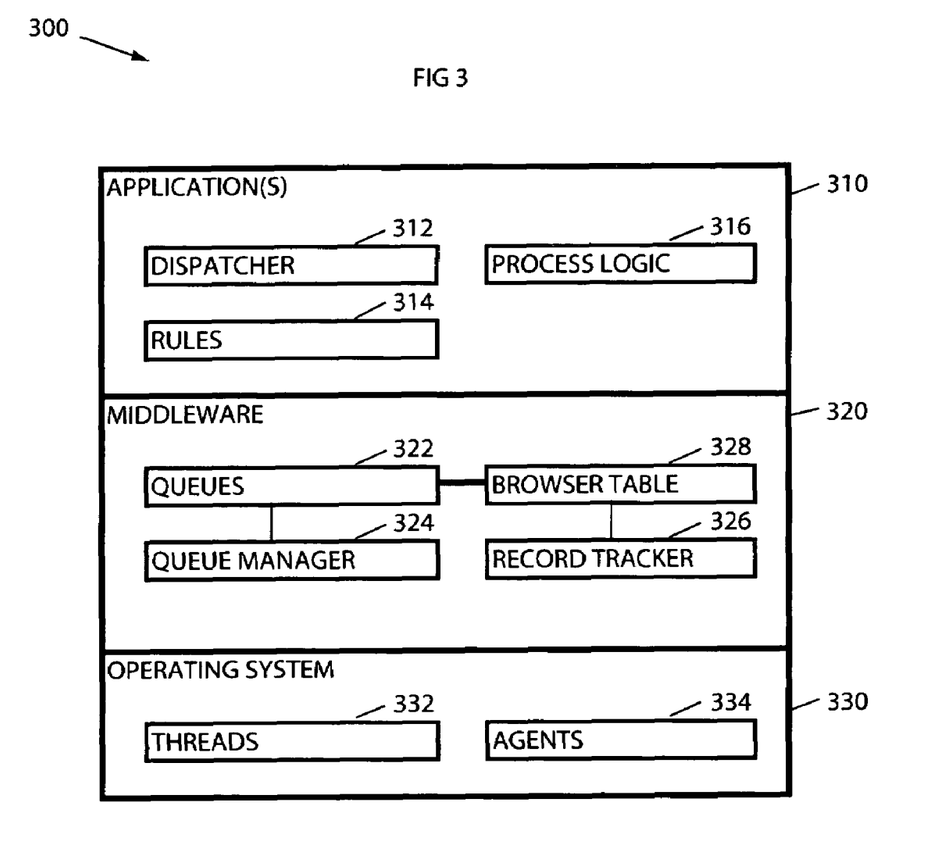
FIG. 3 depicts an example of software tiers for an embodiment such as the embodiment depicted in FIG. 1.

FIG. 3 depicts an example of software tiers for an embodiment such as the embodiment depicted in FIG. 1. Software tiers 300 include three tiers: applications 310 often referred to as upperware, middleware 320, and operating system 340. In other embodiments, software tiers 300 may include more tiers.

Applications 310 may include applications to process messages such as dispatcher 312, rules 314, and process logic 316. Dispatcher 315 and rules 317 assign a thread from available threads 332, to the message to implement process logic 312. For instance, dispatcher 314 may be designed to browse queues 322 and process data having attributes or associated with attributes indicating that certain processing should be implemented to transform the data.

Upon accessing rules 314, a thread 332 assigned to process a message by dispatcher 312 may access process logic 316 for instructions to implement the processing. Process logic 316 may include programs to, e.g., display data on a monitor, interface with other computers to display data and/or gather data, and/or gather data from a local database.

Middleware 320 may coordinate processing of messages, persistence of messages, and tracking the latest record accessed by agents 334. In particular, middleware 320 includes queues 324, queue manager 324, record tracker 326, and browser table 328. Queues 324 and queue manager 326 may store and persist data in queues 322. Record tracker 326 may monitor accesses by each agent of agents 334, or agents that set the browse attribute when initially establishing communication with queues 322. Record tracker 326 may then store the latest record accessed by the agent in browser table 328 and associate the record with the corresponding agent. In some embodiments, record tracker 326 may include logic to monitor records associated with agents and store an indication that a message is unavailable in the event that the message becomes unavailable. In such embodiments, queue manager 430 may return the indication that the message is unavailable in response to a request for that message by the corresponding agent.

Operating system 330 may include an operating system such as Microsoft WINDOWS™, Sun SOLARIS™, IBM advanced interactive executive (AIX), or other systems adapted to interface with middleware 320. Operating system 330 includes threads 342 to be assigned to process messages by dispatcher 315 and to generate a committed reply to store in an outbound queue of queues 324. Operating system 330 also includes agents 334 for managing the flow of data between data sources such as data sources 112 and 122, and data targets such as data target 164 of FIG. 1. Agents 334, for example, may reformat data of messages stored in queues 322 to a universal format designed for compatibility with API's utilized to access queues 322 by clients and other computer systems.

Figure 4:
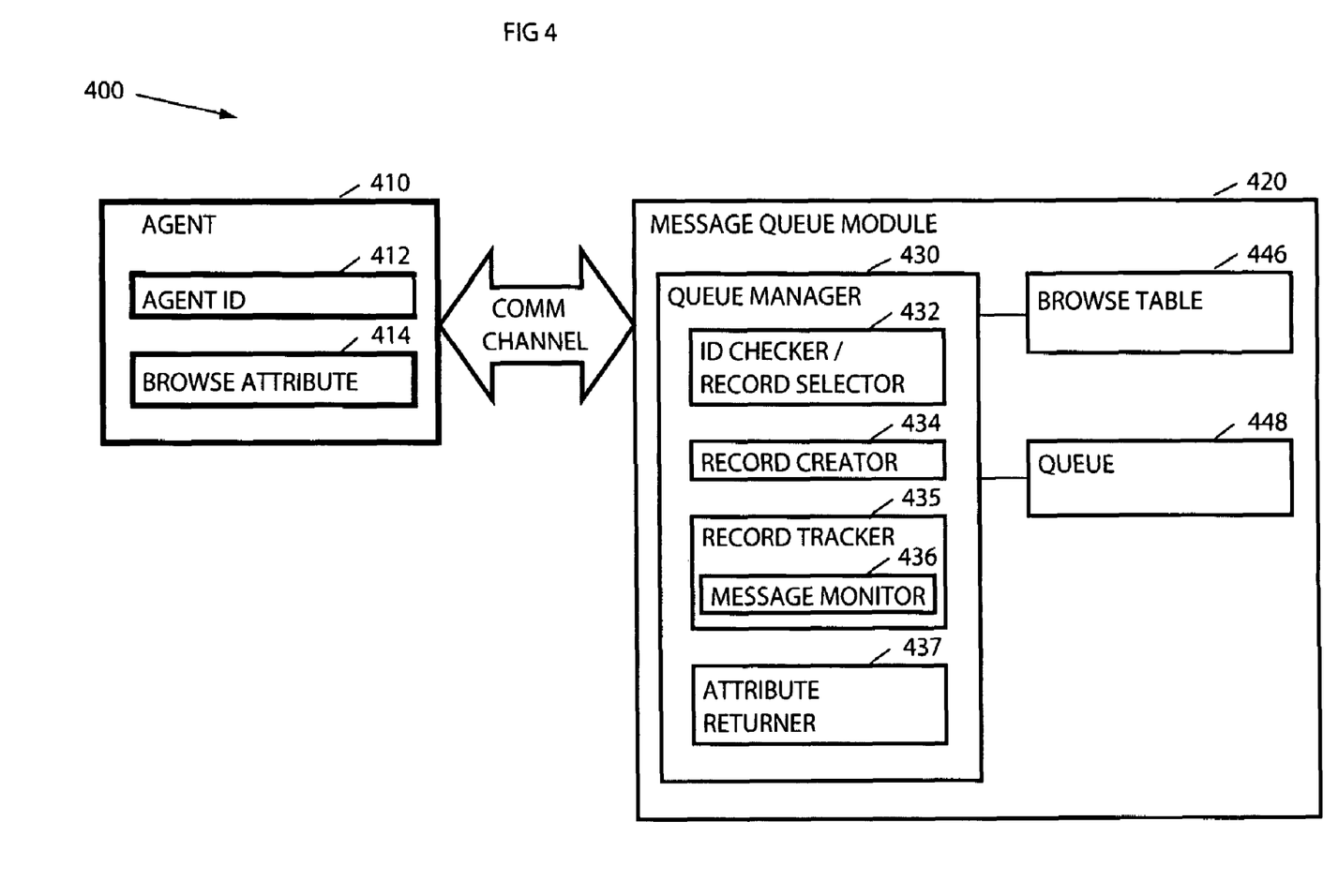
FIG. 4 depicts an embodiment of an apparatus including agents to browse and gather data from queues of a message queue module.

Referring now to FIG. 4, there is shown an embodiment of an apparatus 400 to enhance browsing of a message queue. Apparatus 400 includes a message queue module 420 to maintain data and an agent 410 to retrieve the data for use by a computer system. In particular, agent 410 includes agent ID 412 and browse attribute 414. Agent 410 may be logic designed to browse data maintained in queue 448 of message queue module 420 and collect data based upon criteria defined for agent 410. In many embodiments, agent 410 may be included as part of an operating system.

As an initial step, agent 410 establishes a communication channel with queue 448. For instance, agent 410 may be assigned an agent ID 412 and a browse attribute 414. In some embodiments, the browse attribute 414 and/or agent ID 412 may be hard coded. In other embodiments, agent ID's 412 may be assigned on a first come, first serve basis from a limited number of values.

Agent 410 transmits agent ID 412 and browse attribute 414 to message queue module 420 to request establishment of a communication channel and, in some embodiments, to request to browse a first record of queue 448. When browse attribute 414 is turned on, message queue module 420 will track the current record of queue 448 being browsed by agent 410. On the other hand, when browse attribute is turned off, message queue module 420 will not track the current record being accessed by agent 410. Tracking the current record advantageously provides agent 410 with the ability to begin browsing at the last record browsed prior to a failure that interrupts the communication channel established between agent 410 and message queue module 420. For example, a power fluctuation disrupts the communication channel between agent 410 and message queue module 420. Just before the power fluctuation, message queue module 420 receives a message from agent 410 requesting data from record 130,450. Agent 410, having the same agent ID 412, requests establishment of a communication channel with queue 448. If agent 410 transmits the browse attribute 414 as turned on, message queue module 420 associates agent ID 412 with record 130,450 and allows agent 410 to begin browsing records at the same point as before the power fluctuation. Otherwise, message queue module 420 may restart agent 410 at the first record in queue 448. The first record in queue 448 may be, for instance, the first record based upon priorities associated with messages in queue 448 and/or based upon the structure of queue 448, e.g., FIFO, first in, last out (FILO), or the like.

In some embodiments, agent 410 may advantageously request that the number of the last record be returned to agent 410. For instance, agent 410 may crash when attempting to process data from record 1000. After re-establishing communication with browse attribute 414 set, agent 410 may crash a second time after trying to process the data in record 1000. Embodiments of agent 410 may recognize the latter crash as being the second crash and/or associate the second crash with processing the data returned from record 1000. As a result, agent 410 may request the record number in a current record identifier as tracked by message queue module 420 and receive the value 1000. Another agent may then implement a process to delete record 1000 or to initiate a process of gathering the data for record 1000 and storing the valid value for record 1000 in queue 448.

Message queue module 420 may be designed to store data in queue 448 for access by one or more agents such as agent 410. Message queue module 420 includes a queue manager 430, a browse table 446, and queue 448. Queue manager 430 may establish and maintain a communication channel between agents such as agent 410 and message queue module 420. Further, queue manager 430 may parse an incoming message to recognize a request to track and/or establish the current record being operated on by agent 410 based upon a setting associated with browse attribute 414.

Queue manager 430 includes ID checker/record selector 432, record creator 434, record tracker 435, and attribute returner 437. In response to receipt of a request to from agent 410 to establish a communication channel, if browse attribute 414 is turned on, ID checker/record selector 434 checks to determine whether the agent ID 412, which is included with the request, is associated with an entry of browse table 446. If the agent ID 412 is associated with an entry or record, ID checker/record selector 434 selects the record stored in browse table 446 that is associated with agent ID 412 as the current record for browsing by agent 410.

On the other hand, if the agent ID 412 is not already associated with a record in browse table 446, record creator 432 may insert a new record in browse table 446 to track the latest record accessed by agent 410. For example, after a crash and restart of agent 412, agent 412 is assigned a new agent ID. The new agent ID cannot be associated with the old agent ID stored in browse table 446 by ID checker/record selector 434 so the current record is set to a first record in queue 448.

Record tracker 435 may monitor accesses by agent 410 when the browse attribute is set. Record tracker: 435 may then store the current record being browsed by agent 410 in browser table 446 and relate that record to agent 410. Record tracker 435 may also include a message monitor 436. Message monitor 436 may determine that a message associated with an agent is no longer available and store a code indicative of such, in place of or in addition to the record identifier. In such situations, queue manager 430 may return the code or other indication that the message is unavailable. Queue manager 430 may also reset the pointer to the first available record, e.g., based upon a message filter or message priority. Queue manager 430 may then return the corresponding message.

Attribute returner 436 is designed to respond to requests for the latest record browsed by an agent like agent 410. For example, agent 410 may generate a message that is interpreted as a request for the latest record browsed by agent 410. Attribute returner 436 reads the contents of the record identifier associated with agent ID 412 and returns the contents in a reply to the message.

Browse table 446 is a table, relational database, file, or other aggregate of data that associates agents like agent 410 with record identifiers such as record numbers, pointers, or the like for queue 448. For example, browse table 446 may include a number of rows, each having a unique agent ID associated with a pointer for queue 448. The pointer may include a logical representation of a row number in queue 448. The row number that may be determined by, e.g., looking up the logical representation in another table that describes relationships between logical representations and row numbers.

Queue 448 may include memory such as random access memory (RAM). Embodiments implemented with RAM may protect the contents of queue 448 by periodically copying new or modified entries into non-volatile memory such as flash memory. In some embodiments, a local queue manager associated with queue 448 may manage backing up entries in queue 448 and repopulating queue 448 in case the contents are cleared or invalidated. For instance, a crash or power loss may clear the contents of queue 448 in RAM. In response to the crash or loss of power, the local queue manager may restore the contents in RAM for queue 448 from the latest backup of queue 448 in flash memory.

Figure 5:
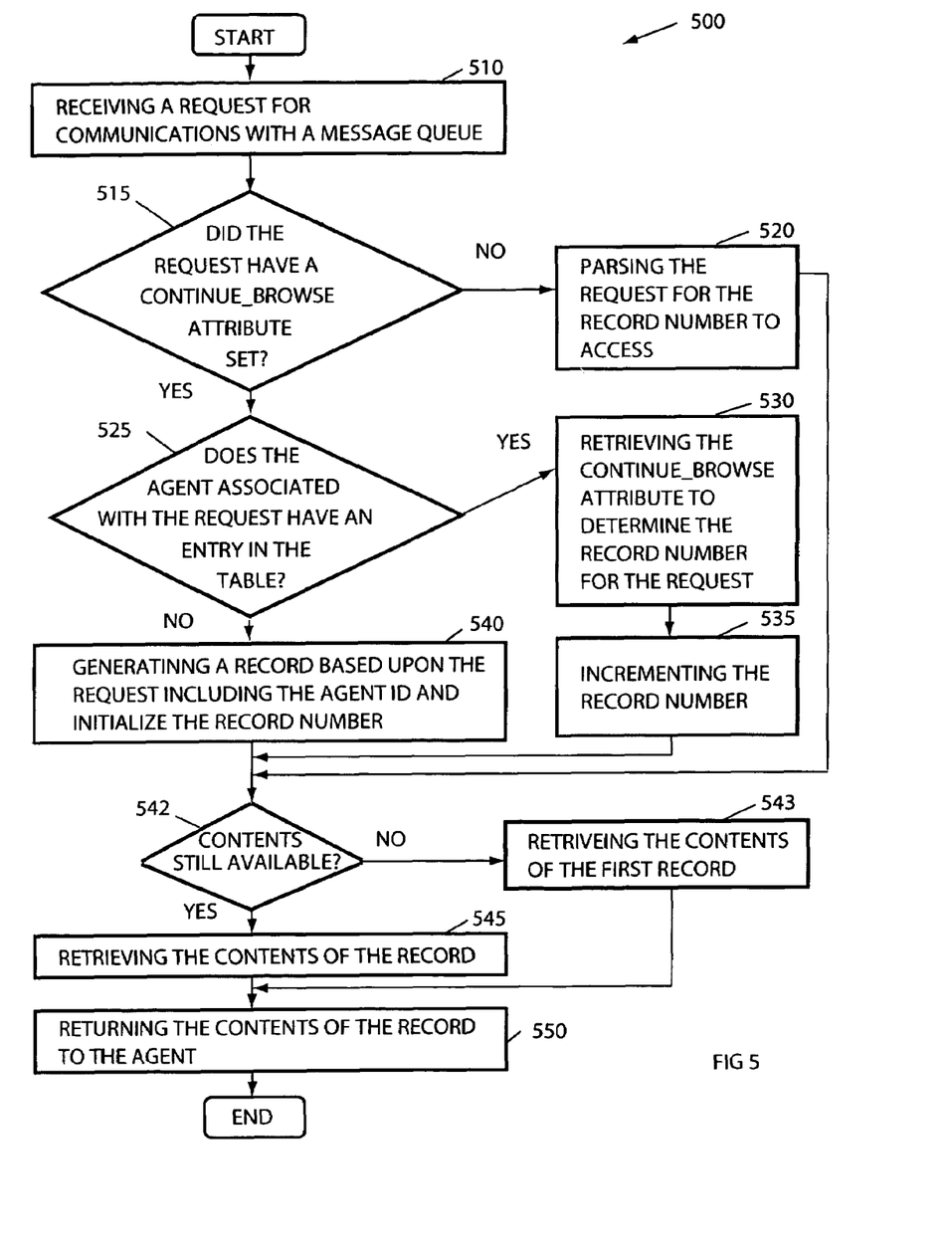
FIG. 5 depicts an example of a flow chart for a method to enhance browsing of messages in a message queue.

Referring now to FIG. 5, there is shown an example of a flow chart 500 for a method to enhance browsing of a message queue. Flow chart 500 begins with element 510, receiving a request for communications with a message queue. A message queue manager may receive the message from an agent of a computer system that previously established a communication channel with the message queue or from an agent that has not previously established a communication channel. In some embodiments, an inbound queue receives the message and a dispatcher copies the message into a working or outbound queue to facilitate persisting the message to protect against loss of the message as a result of a message queue system failure.

After storage in the working or outbound queue, the message is parsed to determine whether the continue_browse attribute included with the message is set (element 515). For example, when the message requests the establishment of a new communication channel, the request may either set an continue_browse attribute to establish tracking of the current record number being accessed by the agent or not set the continue_browse attribute to indicate that the agent does not need the current record to be tracked by the message queue manager. For instance, the agent may track the current record being browsed so asking the message queue manager to track the current record number would be redundant and unnecessary.

For situations in which the message requesting the establishment of the communication channel does not set the continue_browse attribute, the pointer for the agent may supply the first record number in the request. The message queue manager may then parse the request for the record number to access (element 520) and, if no record number is found, initialize the communications to the first record in the message queue. In some embodiments, the messages may not include record numbers so the record number may be automatically set to the first record number in the message queue.

When the continue_browse attribute is set, the agent ID associated with the message is compared against agent ID's in a browse table to determine whether the agent has an entry for the most recently accessed record number. If the agent ID is found, the record number is retrieved from the table (element 530) and, in some embodiments, incremented (element 535) to determine the record number to access in response to the message. For example, the message may request the most recently accessed record so element 535 may be skipped. On the other hand, when the message requests access to the next record number, the most recently accessed record number is incremented to determine the record to access.

When no corresponding agent ID is found in the browse table, the message queue manager interprets the message as a request to establish of the communication channel and the setting of the continue_browse attribute set as a request to track the most recently accessed record number. Thus, the message queue manager creates a new row in the browse table associated with the agent ID of the agent and initializes the most recently accessed record number to the first record (element 540). In several embodiments, the most recently accessed record may be initialized to zero in case of a failure before the contents of the first record is returned to the agent.

In further embodiments, when the message relates to an established communication channel, the message may request the return of data from the next record in the message queue. If a filter is applied to the records being browsed by the agent, the dispatcher may allocate a thread to determine the next record based upon the filter.

Once the queue manager determines the record number associated with the message, the contents of that record are verified. In particular, if the message originally identified by the record identifier is unavailable or replaced, such an indication may be associated with the record identifier for the agent. If the message is available (element 542), the contents of that record are retrieved (element 545) and returned to the agent that initiated the request (element 550). Otherwise, the contents of a first record in the queue are retrieved (element 543) and returned to the agent that initiated the request (element 550).

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media to enhance browsing of a message queue by, e.g., tracking the current record number being browsed by an agent. It is understood that the form of the invention shown and described in the detailed description and the drawings are to be taken merely as examples. It is intended that the following claims be interpreted broadly to embrace all the variations of the example embodiments disclosed.

What is claimed is:

1. A method to enhance browsing of a message queue of a middleware application, the method comprising:

receiving from an agent, by the middleware application, a request to track a first message, wherein the request is associated with browsing the first message in the message queue and the message queue is stored in a data warehouse accessible by more than one agent;

creating, a record in the middleware application to associate the first message with the agent in response to the request to track the first message; and creating a first communication in a connection between the agent and the message queue; and re-establishing the connection between the message queue and the agent based upon the record, in the middleware application after a loss of the first communication between the agent and the message queue.

2. The method of claim 1, further comprising modifying, by the middleware application, the record to associate the agent with a second message in response to receipt of a subsequent request from the agent to browse the message queue for the second message and establishing, by the middleware application, the association between the second message and the agent based upon the modified record.

3. The method of claim 2, wherein establishing, by the middleware application, the association comprises:

receiving a new request to browse the message queue from the agent;

establishing the communication channel between the message queue and the agent in response to the new request; and identifying the record based upon an agent identification associated with the agent in the new request.

4. The method of claim 3, further comprising:

determining that the second message is unavailable in response to the new request and returning to the agent an indication that the second message is unavailable.

5. The method of claim 2, further comprising replying, by the middleware application, to the agent with a record identification for the second message that describes a location of the second message in the message queue in response to a different request from the agent for the record identification.

6. The method of claim 1, wherein receiving from the agent, by the middleware application, the request comprises receiving an attribute setting as part of the request, wherein the attribute setting instructs the middleware application to track a recently browsed message by the agent in the message queue, the recently browsed message being the first message based upon the request.

7. The method of claim 2, wherein creating, the record comprises storing in a database the record having an agent identification associated with the agent and a record identification associated with the first message.

8. The method of claim 7, wherein modifying, by the middleware application, the record comprises updating the record identification to associate the agent with the second message instead of the first message.

* * * * *